(No Model.)

W. VANDERMAN.
COUPLING FOR WATER CLOSETS.

No. 538,301. Patented Apr. 30, 1895.

Witnesses

Inventor
William Vanderman
By James Shepard.
Atty.

UNITED STATES PATENT OFFICE.

WILLIAM VANDERMAN, OF WILLIMANTIC, CONNECTICUT.

COUPLING FOR WATER-CLOSETS.

SPECIFICATION forming part of Letters Patent No. 538,301, dated April 30, 1895.

Application filed June 11, 1894. Serial No. 514,239. (No model.)

*To all whom it may concern:*

Be it known that I, WILLIAM VANDERMAN, a citizen of the United States, residing at Willimantic, in the county of Windham and State of Connecticut, have invented certain new and useful Improvements in Couplings for Water-Closets, of which the following is a specification.

My invention relates to improvements in couplings for water closets, and the main objects of my improvement are simplicity and efficiency, and particularly to provide a coupling that is adapted for either old or new work.

Figure 1:
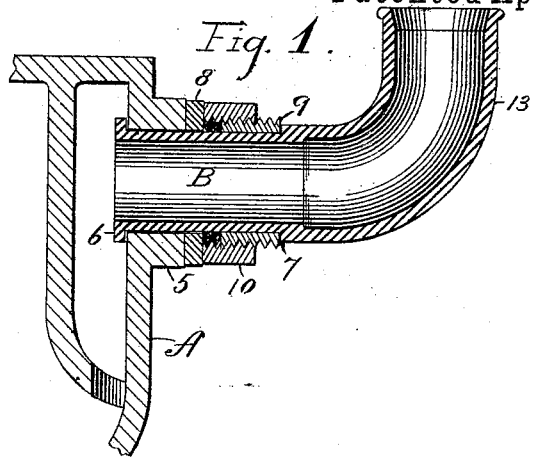
Figure 2:
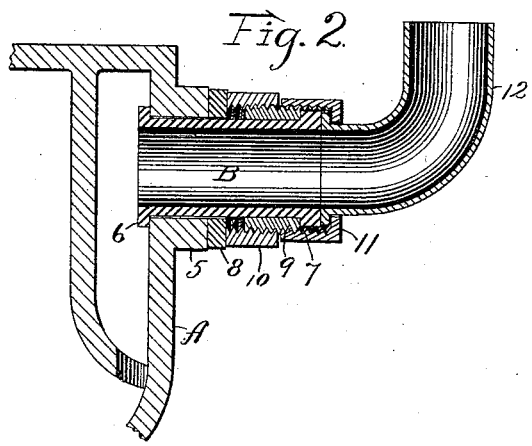
Figure 3:
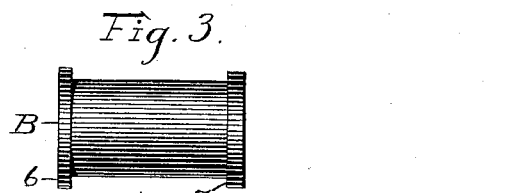
Figure 4:
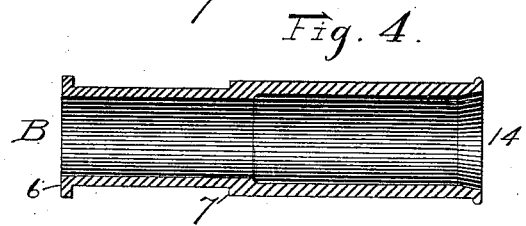

In the accompanying drawings, Figure 1 is a vertical section of my coupling and so much of a water closet bowl as is necessary to show its connection. Fig 2 is a like view of the same in a somewhat modified form. Fig. 3 is a side elevation of the connecting tube; and Fig. 4 is a central longitudinal section of the same with an extension at its outer end.

A designates a portion of a water closet bowl having the horn 5 with a suitable inlet opening through it.

B designates a tubular flexible connection having at its inner end a flange 6 and at the opposite end of the connection proper, a shoulder 7.

8 designates a washer or other suitable packing placed against the outer end of the horn, and 9 is a sleeve which is externally threaded and whose inner diameter is practically equal to the diameter of the tubular connection.

10 designates a larger sleeve which is internally threaded and which is screwed upon the sleeve 9.

The flange 6 is deflected inwardly and forced through the ring 9, packing 8 and the horn 5 of the water closet, as shown in Figs. 1 and 2, and then the sleeve 10 is screwed so as to carry it off from the sleeve 9 to press the outer edge of the sleeve 9 against the shoulder 7 of the connection B and draw the flange 6 against the seat surrounding the inside of the horn, while the edge or end of the ring 10 firmly presses the packing 8 against the outer end of the horn, thereby firmly securing the connection B within the horn of the bowl. More or less packing may be employed for any variation in the length of the horn.

The outer diameter of the sleeve 9 should be a little in excess of the diameter of the connection B at the shoulder 7 so that when desired the outer end of the sleeve 9 may serve as the threaded connection for receiving the ordinary coupling ring 11, of Fig. 2.

Fig. 2 is the same as Fig. 1 with reference to the parts so far described with the addition of the coupling ring 11 and the ordinary flanged metallic elbow 12, while the flexible elbow 13, which is shown in Fig. 1, as made integral with the flexible connection B, is omitted. The essential features of the rubber or flexible connection B are shown in Fig. 3, and it is immaterial to this portion of the device whether the connection B terminates at the point shown in Fig. 3, or whether a flexible portion of pipe is extended therefrom and integral therewith, as in Fig. 1.

In Fig. 4, I have also shown the connection B as having extending therefrom a flexible portion 14 of a straight instead of a curved or elbow form.

The connection B may be made either in the short form shown in Figs. 2 and 3 or it may be made with either of the extensions shown in Figs. 1 and 4, and it is obvious that if the parts 13 or 14 are not wanted they may be cut off in the line of the outer end of Fig. 3 and thereby produce precisely the same thing as the tubular connection B of Fig. 3. I prefer, however, to provide the connections in all three of the forms, as shown.

In all cases the two ends of the horn should be clamped between the flange 6 and shoulder 7 and when the horn is of less length than the distance from said flange to said shoulder, some kind of filling or packing should be employed to fill said space and cause the parts to clamp both ends of the horn. While I prefer to employ the two screw sleeves for this purpose, I do not wish thereby to waive any right as to equivalents, nor to limit my claims for the flexible tubular connection to such screw sleeves.

I claim as my invention—

The combination with the horn of the bowl, of the flexible tubular connection B, having a flange 6 for engaging the inner seat around the orifice in the horn, and the shoulder 7 at its outer end; the externally threaded sleeve surrounding said connection, and the internally threaded sleeve screwed upon said externally threaded sleeve the respective ends of said sleeves arranged for pressing against the outer face of the horn and the shoulder 7 and thereby holding the flange 6 to its seat, substantially as described and for the purpose specified.

WILLIAM VANDERMAN.

Witnesses:
THOMAS J. KELLEY,
WILLIAM HILLHOUSE.